Patented Sept. 9, 1924.

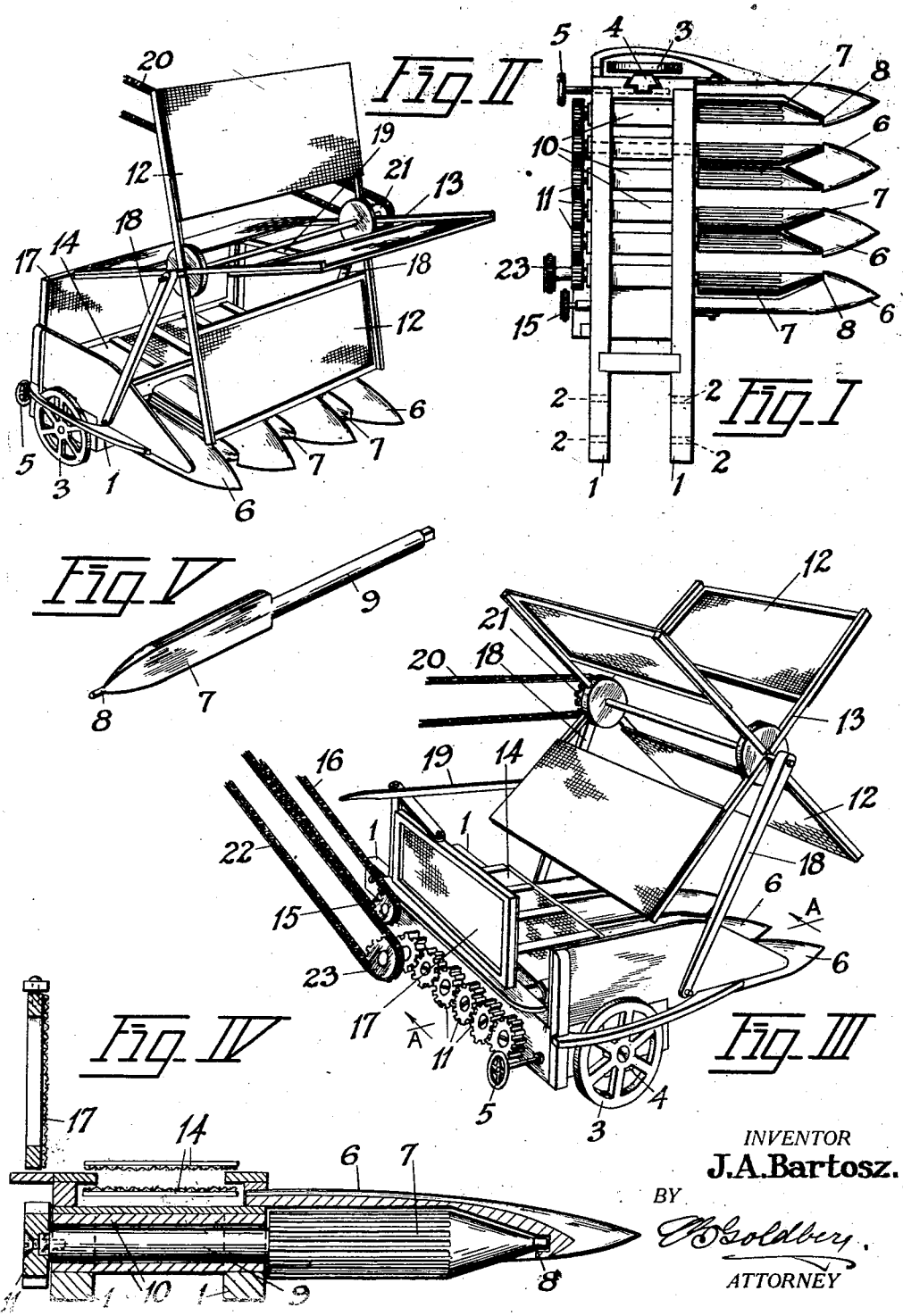

1,507,656

UNITED STATES PATENT OFFICE.

JOSEPH A. BARTOSZ, OF TURNER, OREGON.

FLAX-PULLER ATTACHMENT FOR BINDERS.

Application filed April 8, 1921. Serial No. 459,556.

*To all whom it may concern:*

Be it known that I, JOSEPH A. BARTOSZ, a citizen of the United States, residing at Turner, in the county of Marion and State of Oregon, have invented a new and useful Flax-Puller Attachment for Binders, of which the following is a specification.

My invention relates to improvements in flax puller attachments for binders, in which revolving rollers are pushed into a flax field, the flax is pulled out by the roots, then thrown onto a conveyor, and from there delivered to a binder.

The objects of my invention are:

To furnish a mechanism which can be attached to any binder, which pulls any plant that protrudes five inches or more above the ground, and in which a special roller enables the pulling of flax without spilling any seeds.

I attain these objects with the mechanism illustrated in the accompanying drawing, in which—

Fig. I is a bottom view of the entire apparatus.

Fig. II is a perspective view of the flax puller, mainly to show the construction at the front.

Fig. III is a perspective view, principally to show the construction at the rear.

Fig. IV is a section through Fig. III along the line A—A.

Fig. V is a detail view of the roller with the flattened side in the foreground.

Similar numerals refer to similar parts throughout the several views.

Two parallel and horizontal outriggers 1 are rigidly connected with each other and have one end bolted to the side of a binder, (the bolt holes are shown at 2), while the other end is supported on a wheel 3 whose axis rests in a vertically sliding bearing 4 and may be adjusted for height by the turning of a hand wheel 5, the connection between hand wheel and bearing being on the well-known rack and pinion principle. Attached to the front outrigger are a plurality of pointed guards 6 which house the rollers 7. The front end 8 of each roller is attenuated and pivoted within the guards, while the shaft 9 at the rear end of the roller is held in bearings 10 in the outriggers and bearings extend from one outrigger to the other. The rotation of the rollers is synchronized by a train of gears 11 affixed to the rear ends of the shafts. The shape of the rollers 7 is clearly illustrated in Fig. V, there it is shown that the side of the roller is flattened. Two rollers in adjacent guards with their flattened sides in juxtaposition leave a clear space for the entering of the flax stalks. As the rollers continue to rotate the cylindrical portions of the two rollers press against each other, pull the plants, and by the time that the flattened sides have again reached juxtaposition, the plants have attained a momentum vertically upward, which throws the roots clear off the rollers and the entire plant into the path of the wings 12 on the reel 13. The wings throw the plants on the conveyor belt 14, from whence they are delivered to the binder.

The conveyor is supported on the outriggers in the customary manner and driven by a sprocket 15 and chain 16 from the binder. A canvas screen 17 near the side of the conveyor prevents the flax from being thrown too far.

The reel is supported on the outriggers by the standards 18.

A handle 19 attached to one of the reel standards permits an adjustment of the reel according to the height of the plants. The reel is driven by a chain 20 and sprocket 21 from the binder, and so is the train of gears by means of the chain 22 and sprocket 23.

It may further be mentioned that the cylindrical part of the rollers is preferably covered with rubber, in order to obtain a secure grip on the plants.

Having thus described my invention it will be seen that my objects have been accomplished, and, though I have shown the preferred form of construction, I reserve to myself the right to make minor changes provided I do not violate the spirit and principle of my invention.

I claim.

1. A flax puller attachment comprising, a frame, a plurality of flax pulling rollers journaled in the frame and projecting horizontally from one side thereof, each roller having one side flattened in accordance with Fig. V, a conveyor on the frame reawardly of the flax pulling rollers, a reel adjustably supported on the frame, and a wheel at the end of the frame.

2. In a flax puller attachment, a frame, a plurality of bearings extending from one side of the frame to the other, a shaft journaled in each bearing, a gear at the end of the shaft outside the frame, a rubber covered roller at the other end of the shaft outside the frame, said roller being flattened on one side to substantially one half of its diameter and constituting with the adjacent roller, a flax pulling pair, a conveyor on the frame, a reel on the frame above the rollers, and a supporting wheel adjustably mounted at one end of the frame.

3. In a flax puller attachment, a frame, a plurality of bearings extending from one side of the frame to the other, a shaft journaled in each bearing, a rubber covered roller having one side flattened to substantially one half of its diameter, said roller forming an integral part of the shaft and extending horizontally from one side of the frame, two adjacent rollers being synchronized to form with their flattened and curved sides an alternately opening and closing pair, pointed guards mounted above the rollers and projecting with their points in advance of said rollers to guide the flax stalks into the opening pair, a reel mounted on the frame and rotating past the guards, a conveyer on the frame, and a supporting wheel at one end of the frame.

Signed by me at Portland, Oregon, this 2nd day of April, 1921.

JOSEPH A. BARTOSZ.